United States Patent [19]

Aoyagi

[11] Patent Number: 5,166,668
[45] Date of Patent: Nov. 24, 1992

[54] WIRELESS PEN-TYPE INPUT DEVICE FOR USE WITH A COMPUTER

[75] Inventor: Tetuji Aoyagi, Kanagawa, Japan

[73] Assignee: Data Stream Corporation, Kanagawa, Japan

[21] Appl. No.: 683,595

[22] Filed: Apr. 10, 1991

[51] Int. Cl.$^5$ .............................................. G09G 3/02
[52] U.S. Cl. ..................................... 340/710; 340/707
[58] Field of Search ............... 340/710, 707, 709, 706; 250/208.2, 221

[56] References Cited

U.S. PATENT DOCUMENTS

| | | | |
|---|---|---|---|
| 4,550,250 | 10/1985 | Mueller et al. | 340/710 |
| 4,578,674 | 3/1986 | Baker et al. | 340/710 |
| 4,682,159 | 7/1987 | Davison | 340/709 |
| 4,688,933 | 8/1987 | Lapeyre | 340/710 |
| 4,949,080 | 8/1990 | Mikau | 340/706 |

FOREIGN PATENT DOCUMENTS

| | | |
|---|---|---|
| 2352931 | 4/1975 | Fed. Rep. of Germany . |
| 3040364 | 5/1982 | Fed. Rep. of Germany . |
| 3511330 | 2/1986 | Fed. Rep. of Germany . |
| 3838605 | 5/1990 | Fed. Rep. of Germany . |

Primary Examiner—Jeffery A. Brier
Assistant Examiner—A. Au
Attorney, Agent, or Firm—Ostrager & Chong

[57] ABSTRACT

A wireless input device for computer comprises a pen-type input device having a source of light capable of transmitting pulses. Two light receiving elements are provided and these light receiving element are disposed for detecting an incident angle of light inputted from the source of light. The wireless input device also has an input unit body having an operational unit for calculating the position of the pen-type input device from the amounts of light detected by the two light receiving elements.

10 Claims, 8 Drawing Sheets

WIRELESS PEN-TYPE INPUT DEVICE FOR USE WITH A COMPUTER

BACKGROUND OF THE INVENTION

This invention relates to a wireless input system for a computer.

Conventional input devices for computers, for example, in which icons are clicked or a cursor is moved on the display of graphic software include a mouse, a joy stick, a light-pen and others. However, they are all mechanically connected with wires to the bodies of computers.

Recently, as the production of portable computers has been increased greatly, there have been increasing needs for input devices which can be used in any place. Take for instance the mouse which are generally used, they require the flat surface for their operation, and in addition they also require surface conditions that the surface is smoothe and the balls inside mouse do not slip on that surface. When an operator uses a lap-top computer on his laps, he cannot use a mouse. In addition to inconvenience of carrying the computer due to the presence of wire, the input devices have disadvantages that their operations are hindered by obstacles on the desk or the wire become entangled since the wire is caused to move as the mouse moves. Furthermore, the other input devices such as joy sticks have substantially the same disadvantages as mentioned above since the input devices are mechanically connected with wires to the computers.

Furthermore, all those input systems utilize two dimentional movement of a cursor and consideration is not given to the situation wherein three dimentional space input may be required in the future.

As aforementioned, conventional input devices, as represented by mouse are limited greatly in their usages. Furthermore, there is an disadvantage that an operator must touch his fingers off from the keyboard during operation of input device.

SUMMARY OF THE INVENTION

It is, therefore, an object of the invention to provide a wireless input device for computer which can overcome the aforementioned disadvantages arising from the existence of the wire and limited operational circumstances, and can be used in any place.

It is another object of the invention to provide a wireless input device for computer which can be easily altered so as to input three dimentional values in the future use.

These objects are accomplished by a wireless input device for computer which comprises a pen-type input device having a source of light capable of transmitting pulses, two light receiving elements, each for detecting an incident angle of light inputted from said source of light, and an input unit body having an operational unit for calculating the position of said pen-type input device from the amounts of light detected by said two light receiving elements.

BRIEF DESCRIPTION OF THE DRAWINGS

The present invention will be now described in detail with reference to the preferred embodiments illustrated in the accompanying drawings in which.

DESCRIPTION OF THE PREFERRED EMBODIMENTS

Figure 1:
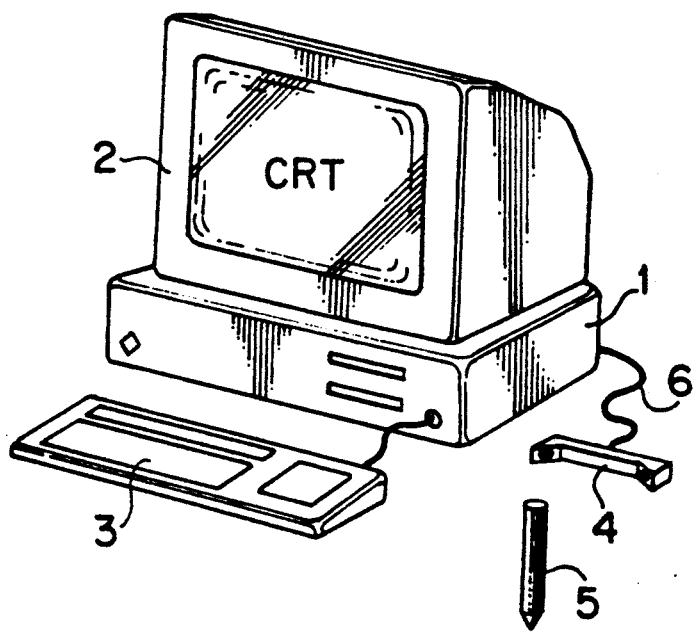
FIG. 1 is a perspective view of the first embodiment according to the present invention wherein a wireless input device comprising a pen-type input unit and a wireless input unit body is used in a personal computer.

Referring now to FIGS. 1 through 4, there are shown a wireless input device for computer which can utilize the configuration of conventional computers without any modification. In FIG. 1, a wireless input unit body 4, hereinafter referred to as input unit body, which is supported on a suitable support such as a table and connected to the end of a mouse cable 6 is connected with a personal computer body 1 which in turn is connected with a CRT 2 and a keyboard 3. A pen-type input unit 5 is configured so that it is received in the power charging section 39 of the input unit body 4 to be in a charged condition when it is not in use and it is pulled out of the charging section 39 when it is in use. Thus, in the first embodiment, the input unit device 4, in place of the conventional mouse, is connected to the conventional computer, and therefore can be used therewith.

Further, the input unit 5 is referred to as a "pen-type input unit" herein since it is preferred that the input unit is made in the form of a pen configuration. However, the input unit according to the present invention is not limited to that configuration and can take any suitable one.

Figure 2:
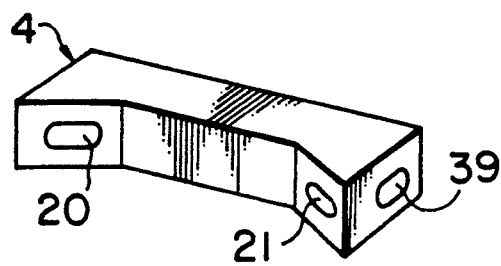
FIG. 2 is an enlarged perspective view of the wireless input unit body.
Figure 3:
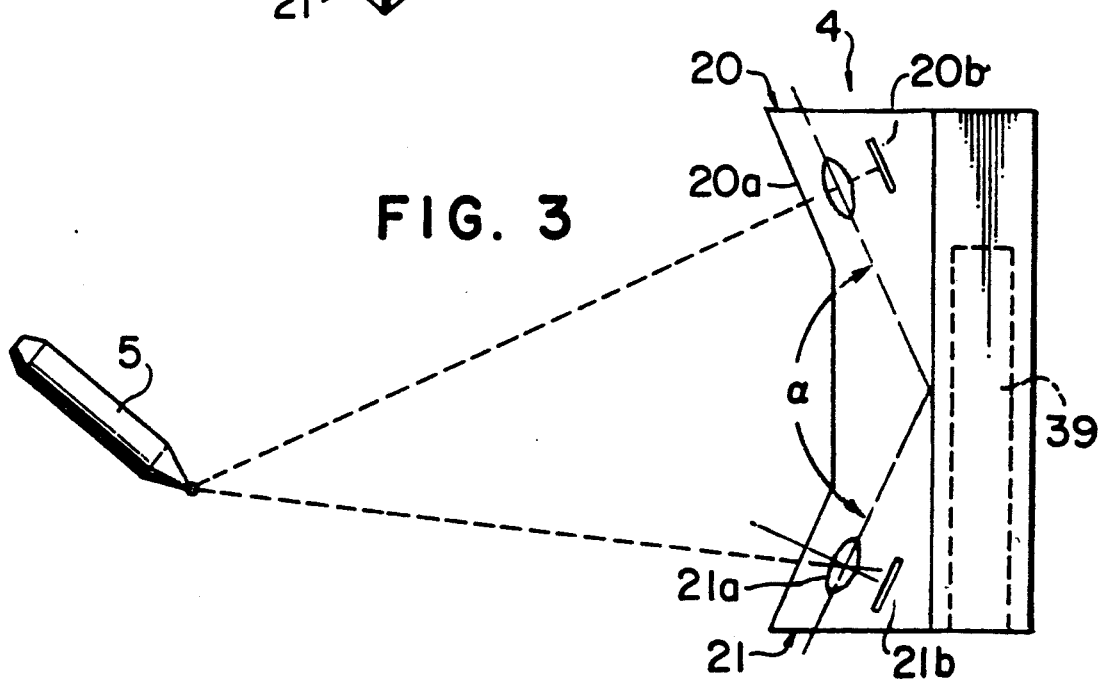
FIG. 3 is a sectional plan view of the wireless input unit body.

The configurations of the input unit body 4 and pen-type input unit 5 will be described in detail with reference to FIGS. 2 through 4. Referring now to FIGS. 2 and 3, the input unit body 4 has a box-type casing which has opposite front walls projecting outward diagonally. The walls are formed with openings. Light receiving elements 20 and 21 are disposed within the casing so that they receive lights through the openings from the pen-type input unit 5.

The light receiving elements 20 and 21 comprises lenses 20a and 21a which focus lights from the pen-type input unit 5, and position detecting light-electricity transducers 20b and 21b such as CCD (charge coupled device) or two-division pin photodiode which are disposed on focus positions to detect light images and transduce the quantities of the light in the position where images are formed into electric signals. These light receiving elements are disposed so that they form a predetermined angle a with each other. As a result, the position of the pen-type input unit can be calculated by the distance between the light receiving elements 20 and 21, the predetermined angle a, and the quantities of the light received on the position detecting light-electricity transducer 20b and 21b of the light receiving elements. Further, an example using two-division pin photodiode as a light receiving element will be described later. Furthermore, although in the two dimensional position detection, the position detecting light-electricity transducer can be of line type, the surface type is required to use for three dimentional position detection.

The input unit body includes other functional elements the detail of which will be described with reference to FIG. 8.

Figure 4:
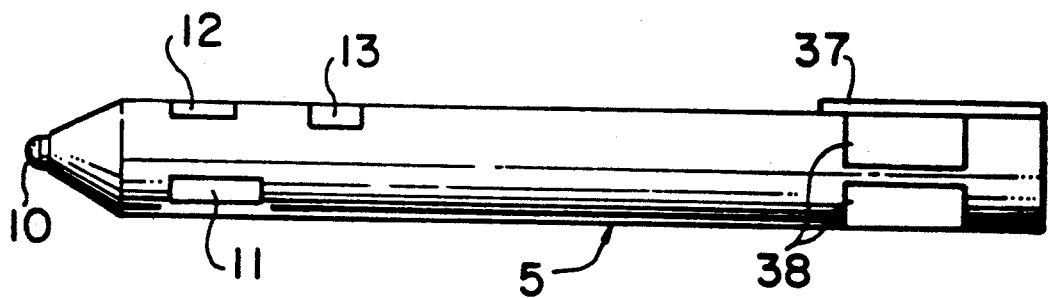
FIG. 4 is an enlarged top plan view of the pen-type input unit.

Referring now to FIG. 4, the pen-type input unit 5 comprises a body and includes a light emitting element (electricity-light transducer) 10 such as LED (light-emitting diode) at the end of its body. The body also includes mouse switch 11, click switches 12 and 13 at the front portion thereof, and a guide bar 37 and power charging terminals 38.

The light emitting element 10 emits light, into which position information and click infomation are transduced, in accordance with instruction of a control circuit, which will be described later. For example, when the mouse switch 11 is depressed by a thumb, the light emitting element 10 emits position pulses of light generated in the unit body. Since general light receiving elements react to a visible ray, filters, not shown, are provided for transmitting only a light of specific wave length, generally infrared ray. Depression of the mouse switch 11 will cause the pen-type input unit to be in operative condition and will cause the light emitting element to be turned on for emitting light as mentioned above. The click switches 12 and 13 are operative as click-on switch and click-off switch when depressed by a forefinger. These click switches become active only when the mouse switch 11 is depressed. It should be noted that two click switches are not always required, and the click-off switch 13 can be omitted.

The guide bar 37 serves as a guide when the pen-type input unit 5 is received in the power charging unit 39 of the input unit body 4. The pen-type input unit 5 is moved along a guide groove, not shown, to be inserted in and pulled out of the power charging unit 39.

Thus, the power charging terminals 38 of the pen-type input unit 5 is positioned relative to corresponding power charging terminals, not shown, of the input unit body 4.

The pen-type input unit includes other functional elements the detail of which will be described with reference to FIG. 7.

Figure 5:
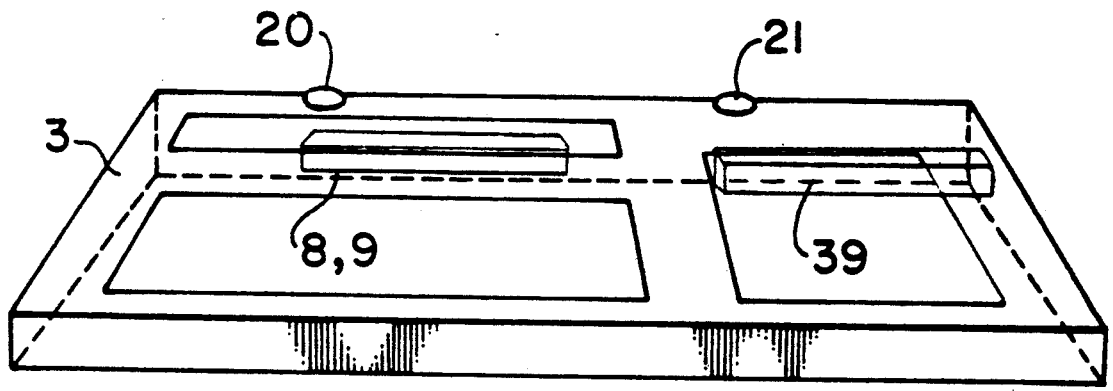
FIG. 5 is a perspective view of a second embodiment of the wireless input unit body.
Figure 6:
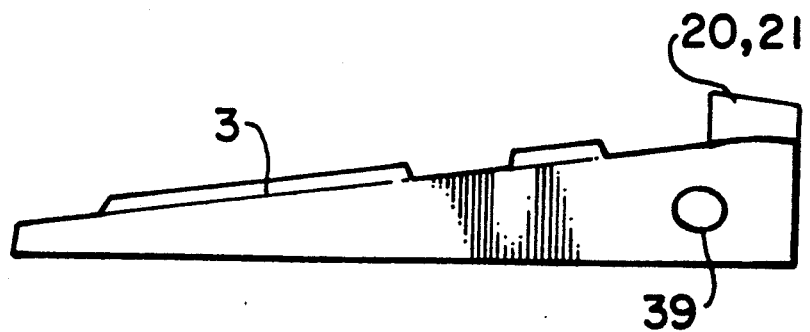
FIG. 6 is a side view of the second embodiment of the wireless input unit body.

Referring now to FIGS. 5 and 6, there is shown a second embodiment of a keyboard built-in type of wireless input device for computer according to the present invention wherein the input unit body 4 is accommodated inside the keyboard 3. The light receiving elements 20 and 21 are mounted on the opposite sides of the rear top surface of the keyboard 3 (FIG. 5 schematically shows these light receiving elements), and the power charging unit 39 is provided on the left side surface of the rear portion of the keyboard 3.

Furthermore, as shown in FIG. 5, a detecting and calculating circuit and a converting circuit are disposed in the body.

Thus, the second embodiment can eliminate inconvenience in handling the input unit body in case where it is made separately from the keyboard.

Referring now to FIGS. 7 through 10, the configuration (the pen-type input unit and input unit body) and operation of the wireless input device for computer according to the present invention will be described.

Figure 7:
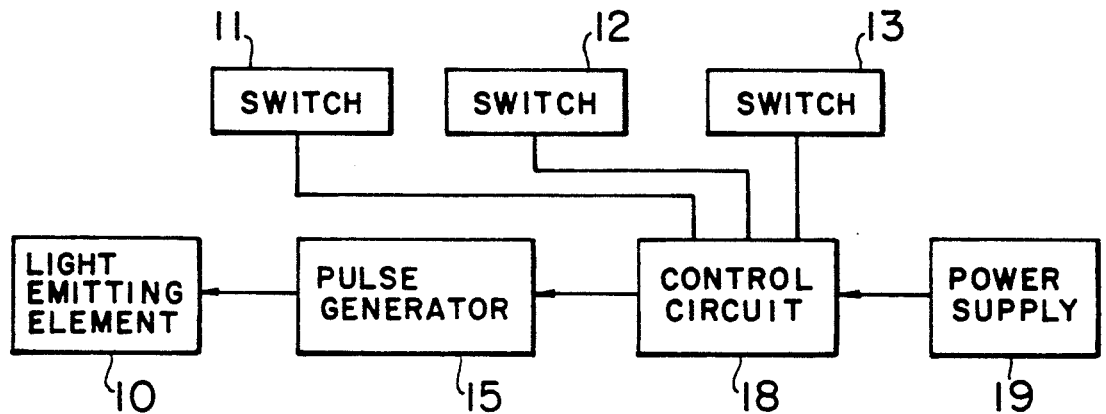
FIG. 7 is a circuit block diagram of the pen-type input unit.

Firstly, referring to FIG. 7, there is shown a block circuit diagram of the pen-type input unit. The light emitting element 10 is an electricity-light transducer, as aforementioned, which emits pulses of light (see FIG. 9) and position pulses including click information (click-on pulses and click-off pulses) (see FIG. 10).

A pulse generator 15 is provided for generating position pulses and the like under a control circuit 18 based on the states of the mouse switch 11 and click switch 12 and 13. The mouse switch 11 is used to switch over the pen-type input unit between operating and non-oprating states and the click switches 12 and 13 generate click-on and click off signals for click-on and click off pulses.

The control circuit 18 controls a whole operation of the pen-type input unit and a power supply 19 is charged through the power charging terminals 38 (see FIG. 4).

Figure 8:
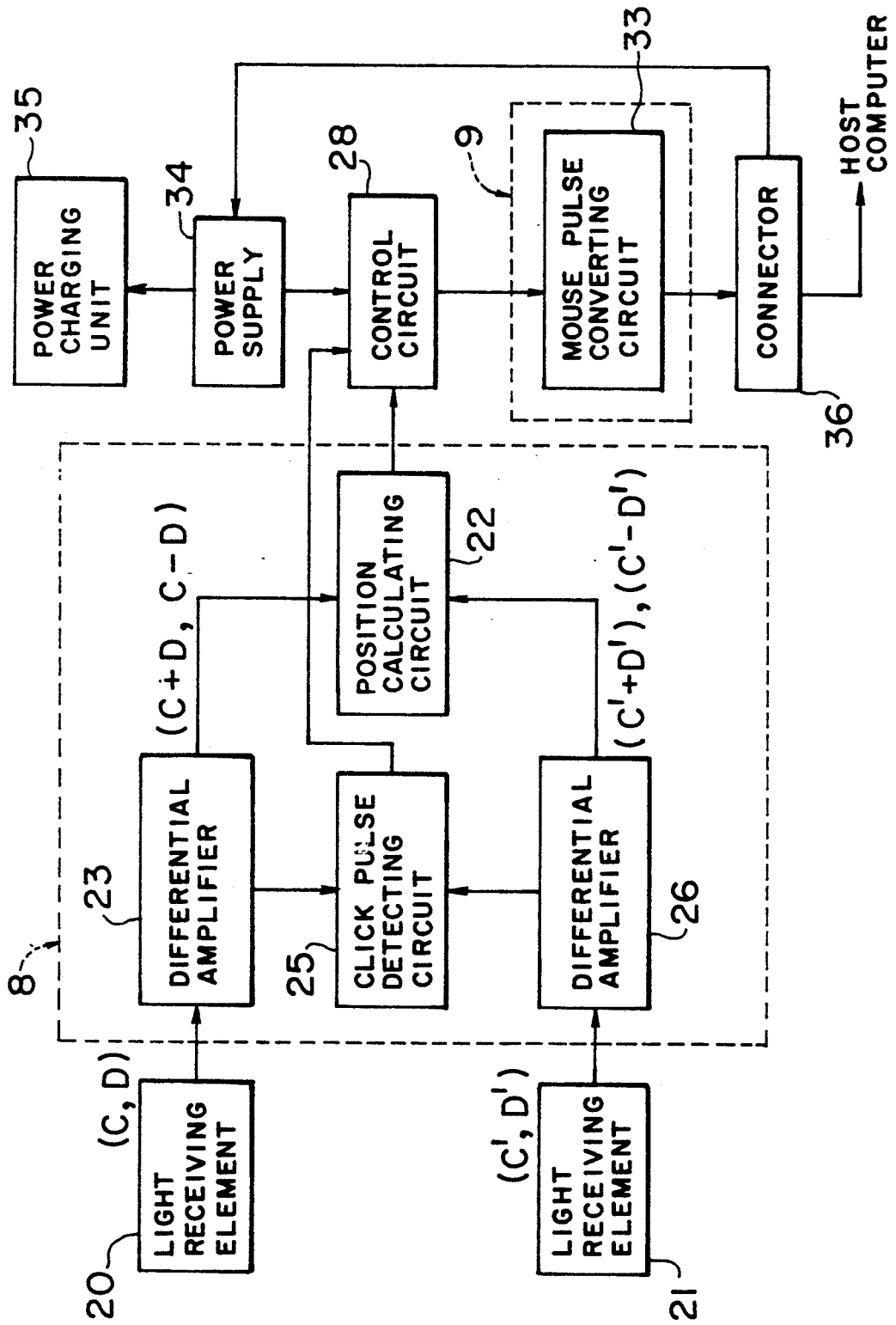
FIG. 8 is a circuit block diagram of the wireless input unit body.

Referring now to FIG. 8, there is shown a circuit block diagram of the input unit body 4. As mentioned above, the light receiving elemnts 20 and 21 receive lights from the pen-type input unit 5. These two light receiving elements 20 and 21 are connected with a detecting and calculating circuit 8 which includes a differential amplifier 23, click pulse detecting circuit 25, a differential amplifier 26 and a position calculating circuit 22. The differential amplifiers 23 and 26 generate outputs of the difference between and the sum of quantities of lights which are received by the two-division pin photodiodes 20 and 21 of the light receiving elements and transduced into electric signals, which will be described in detail hereinafter. The click pulse detecting circuit 25 detects whether any click pulse is included in the electric signals which are received and transduced. The detecion of click pulses can be made by judging the outputs from the light receiving elements since incident lights are modulated by a modulator, not shown, provided within the pen-type input unit. The position calculating circuit 22 calculates the position of the pen-type input unit from information on quantities of lights and other constants.

A control circuit 28 controls a whole operation of the input unit body.

A converting circuit 9 includes a mouse pulse converting circuit 33, which converts the values calculated by the position calculating circuit 22 to the values on orthogonal coodinates of the conventional mouse to generate pulse signals. The mouse pulse converting circuit also converts click pulses recognized by the click pulse detecting circuit 25 to mouse click pulses. In addition to the above, a connector 36 is provided for transmitting the position pulses and mouse click pulses generated by the mouse pulse converting circuit 33 to the body of the personal computer through the mouse cable 6 and for supplying an electric power to the input unit body therethrough. A power supply 34 supplies an electric power to the control circuit 28 as well as each functional element. The power charging unit 35 serves as a power supply for the pen-type input unit.

The position calculation for use in the present invention will be described with reference to FIGS. 11 through 15.

Figure 11:
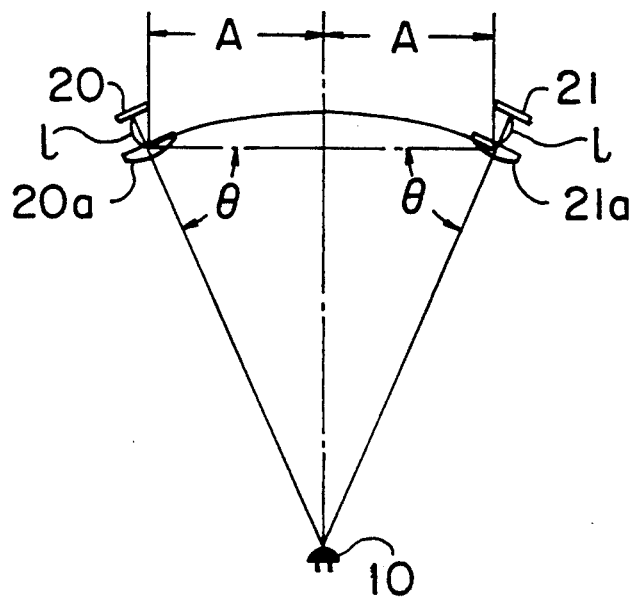
FIGS. 11 and 12 are schematic views for explaining calculation of position.

FIG. 11 shows an optical system for detecting the position and particularly parameters related to the calculation of the position. The parameters to be set which are required for calculation of the position are as follows:

(1) Lens: a diameter of lens, radius of curvature, refractive index and thickness.

(2) Distance between lens and light receiving element: 1 (The distance should be properly selected since it is associated with spot diameter of light and ratio (R) of difference between quantities of lights to sum of quantities of lights).

(3) Distance between lenses: 2A (4) Inclination of lens: $\theta$

Figure 12:
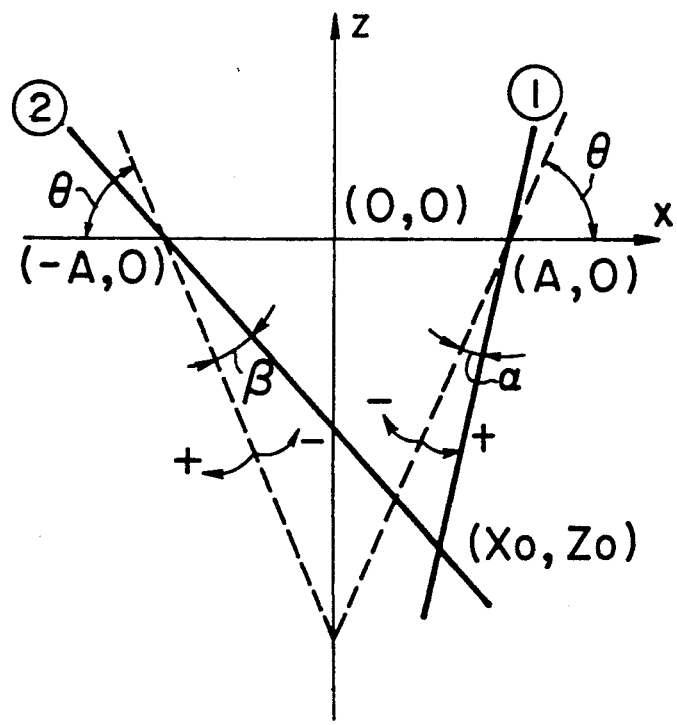

FIG. 12 shows a coodinate system of an optical system for detecting position. The following two equations are derived from the coodinate system.

$$Z = \tan(\theta+\alpha)X - \tan(\theta+\alpha)\cdot A \quad (1)$$

$$Z = -\tan(\theta+\beta)X + \tan(\theta+\beta)\cdot A \quad (2)$$

The intersecting point $(X_0, Z_0)$ of the coodinate are derived from the equations (1) and (2), which are as follows:

$$X_o = A \cdot \{\tan(\theta + \alpha) - \tan(\theta + \beta)\} \div \quad (3)$$
$$\{\tan(\theta + \alpha) + \tan(\theta + \beta)\}$$

$$Z_o = -2A\{\tan(\theta + \alpha) \cdot \tan(\theta + \beta)\} \div \quad (4)$$
$$\{\tan(\theta + \alpha) + \tan(\theta + \beta)\}$$

Figure 13:
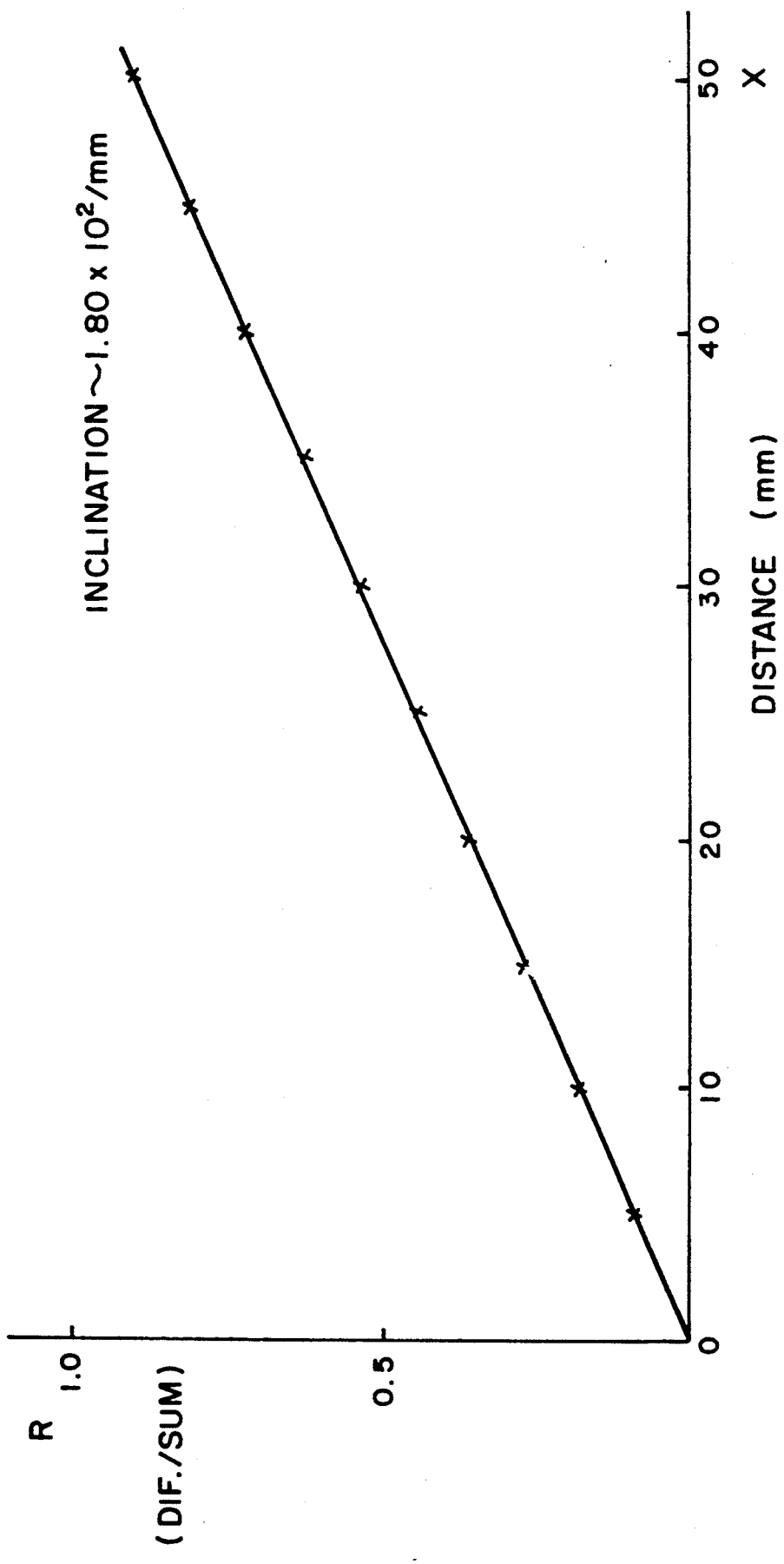
FIGS. 13 through 15 are graphs for determining one parameter for calculation of position.
Figure 14:
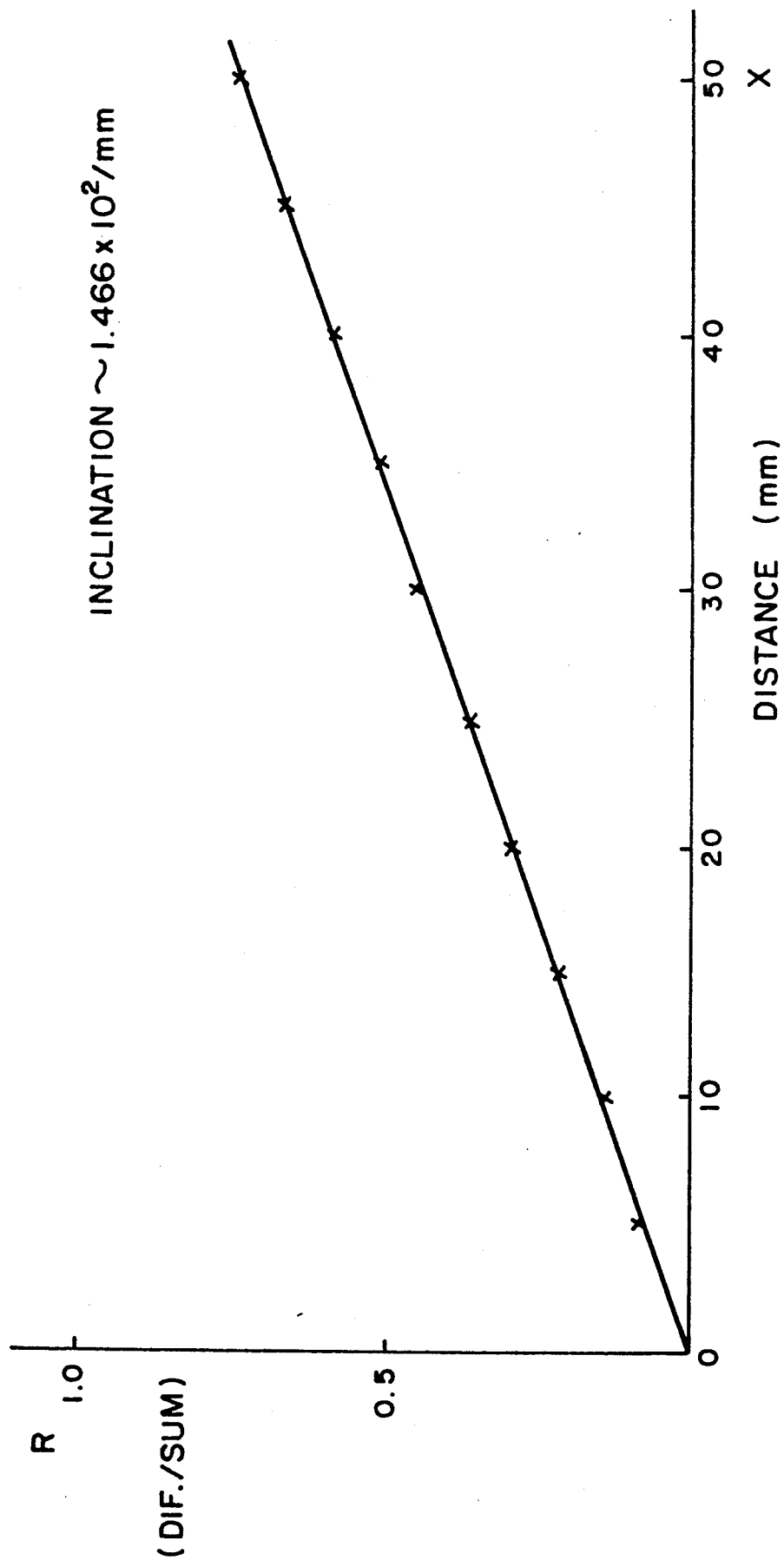
Figure 15:
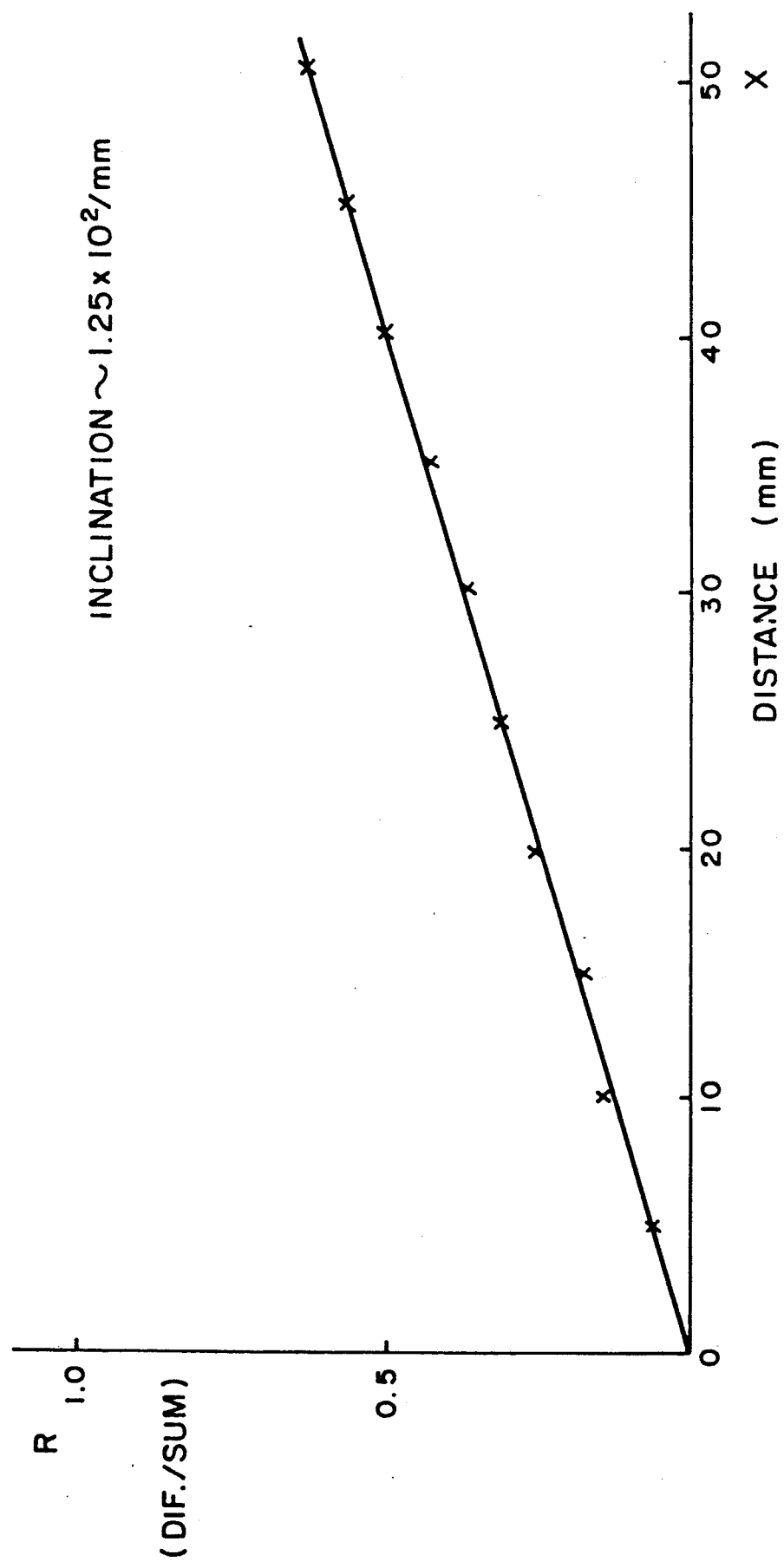

When the distance in the direction of Z is constant, it was found by calculation that a very close proportional relationship was established between the ratio of the difference (C−D) to the sum (C+D) and the distance in the direction of X. The results of calculation is shown in FIGS. 13 through 15. It was also found that the product of inclination K of each gragh and position of Z on that gragh indicates almost constant value (C) within a certain range.

From the graphs, $R = K \times X$, and $K \times$(the position of Z) $\approx$ C are obtained. Therefore, X/(position of Z) = tan $\alpha$ = R/C is obtained.

Thus, the value of tan $\alpha$ can be obtained from one of the two-division pin photodiodes.

Similarly, the value of tan $\beta$ can be obtained from the other.

Finally, the intersecting point $(X_0, Z_0)$ can be obtained from the following equation and constant value of $\theta$.

$$\tan(\theta+\alpha) = (\tan\theta + \tan\alpha)/(1 - \tan\theta\tan\alpha)$$

A sequence of position calculation will be described.

Firstly, at the preparatory stage, the product C of the inclination K of R−X line on the graph and the position Z, and the value of tan $\theta$ are previously obtained.

As aforementioned, the two differential amplifiers output the differences (C−D) and (C′−D′) and the sums (C+D) and (C′+D′) from the quantities of lights (C, D) and (C′, D′) received on the two two-division pin photodiodes from the light emitting element.

The ratio R at each light receiving element is obtained from the position calculating circuit and thus, the intersecting point $(X_0, Z_0)$ is obtained by calculation using the already obtained value C and tan $\theta$.

An operation of wireless input system for computer will be described.

Figure 9:
FIG. 9 is a view showing a waveform of light pulses of the pen-type input unit.
Figure 10:
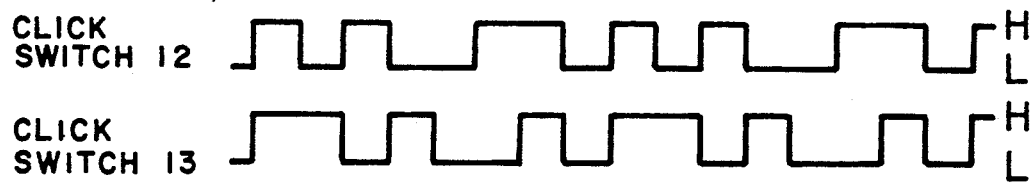
FIG. 10 is a view showing waveforms of position pulses and click pulses of the pen-type input unit.

When the mouse switch 11 of the pen-type input unit is depressed, the control circuit 18 recognizes the depression of the mouse switch 11 and causes the input unit to be operative. At the same time, it causes the pulse generator 15 to generate pulses of light as shown in FIG. 9 and causes the light emitting element 10 to emit the pulses of light. At that time, the control circuit 18 checks the states of the click switches 12 and 13 to instruct the pulse generator 15 to generate position pulses and click pulses corresponding to the states of the click switches 12 and 13. Consequently, the light emitting element 10 emits the position pulses, as shown in FIG. 10, which includes information on the states of the click switches 12 and 13.

The light receiving elements 20 and 21 of the input unit body 4 receive the emitted light pulses which enter through the differential amplifiers 23 and 26 into the click pulse detecting circuit 25, which detects whether the click pulse pulses are included. Based on output from the position calculating circuit 22 determines by calculation the position of the pen-type input unit. The mouse pulse converting circuit 33 converts the position pulses to the values on the orthogonal coodinate of the mouse and the click pulses to mouse click pulses. These pulses are transmitted through the connector 36 to the personal computer.

In the same manner, the other position coordinates of the pen-type input unit 5 will be sequentially obtained. At that time, the direction and distance of movement of a cursor on the display of the CRT 2 is determined, for example, by the on-state of the click-on switch 12.

Although the present invention has been described with regard to the two dimensional movement, it can easily apply to three dimensional movement. That is, the three dimensional movement can be obtained by such modification that two light receiving elements 20 and 21 of the input unit body are made to receive light in the form of plane, not line.

What we claim:

1. A wireless input device for a computer comprising:
   a pen-type input unit having a light emitting element capable of emitting light pulses;
   two light receiving elements spaced apart from each other by a predetermined distance and arranged at a predetermined inclination angle facing toward an area in which said pen-type input unit is positioned, wherein each of said light receiving elements is a two-division light sensing means capable of detecting two separate quantities of incident received from said pen-type input unit indicative of an angle defined by the position of the pen-type input unit relative to the inclination angle of each said light receiving element; and
   a position detecting and calculating circuit electrically coupled to respective outputs of said light receiving elements and having means for calculating position coordinates corresponding to the position of said pen-type input unit derived on the basis of a ratio of the difference in light quantities to the sum of light quantities received by said receiving elements from said pen-type input unit, the predetermined distance between the two light receiving elements, and the predetermined inclination angle of the light receiving elements.

2. A wireless input device according to claim 1, wherein said light receiving elements are two-division pin photodiodes.

3. A wireless input device according to claim 1, wherein said light receiving elements are mounted in opposingly angled front walls of an input unit body adapted to lie on a support surface defining the area in which said pen-type input unit is positioned.

4. A wireless input device according to claim 1, wherein said light receiving elements are mounted in an input unit body formed with a keyboard for the computer.

5. A wireless input device according to claim 1, wherein said light receiving elements are mounted in an input unit body which includes a power charging portion for accomodating said pen-type input unit therein and for charging a power supply of said pen-type input unit via power charging terminals therein.

6. A wireless input device according to claim 1, wherein said pen-type input unit includes a mouse switch for causing the light emitting element to emit light pulses which are detected by said light receiving elements in order to calculate position coordinates corresponding to the position of said pen-type input unit.

7. A wireless input device according to claim 1, wherein said pen-type input unit includes at least one click switch for causing the light emitting element to generate click-on and/or click-off light signals.

8. A wireless input device according to claim 1, wherein said position detecting and calculating circuit includes two differential amplifier circuits for receiving the respective outputs of the two light receiving elements and generating respective light quantities sum and difference signals and supplying them to the position calculating portion of said circuit.

9. A wireless input device according to claim 7, wherein said position detecting and calculating circuit includes a click pulse detecting circuit for detecting click-on and/or click-off light signals generated by the light emitting element of said pen-type input unit.

10. A wireless input device according to claim 7, wherein said light receiving elements are capable of detecting light pulses emitted by said pen-type input device to indicate its position in a three-dimensional space.

* * * * *